US012385338B2

(12) United States Patent
Vick, Jr. et al.

(10) Patent No.: US 12,385,338 B2
(45) Date of Patent: Aug. 12, 2025

(54) AUTONOMOUS TRACTOR USING COUNTER FLOW-DRIVEN PROPULSION

(71) Applicant: Halliburton Energy Services, Inc., Houston, TX (US)

(72) Inventors: James Dan Vick, Jr., Dallas, TX (US); Michael Linley Fripp, Carrollton, TX (US); Xiaoguang Allan Zhong, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/454,644

(22) Filed: Aug. 23, 2023

(65) Prior Publication Data

US 2023/0407716 A1 Dec. 21, 2023

Related U.S. Application Data

(62) Division of application No. 16/424,888, filed on May 29, 2019, now Pat. No. 11,753,885.

(Continued)

(51) Int. Cl.

| | |
|---|---|
| ***E21B 23/00*** | (2006.01) |
| ***E21B 15/04*** | (2006.01) |
| ***E21B 33/068*** | (2006.01) |
| ***E21B 41/00*** | (2006.01) |
| ***E21B 44/00*** | (2006.01) |

(Continued)

(52) U.S. Cl.

CPC .......... *E21B 23/001* (2020.05); *E21B 15/045* (2013.01); *E21B 23/00* (2013.01); *E21B 33/068* (2013.01); *E21B 41/00* (2013.01); *E21B 41/0085* (2013.01); *E21B 44/005* (2013.01); *E21B 44/02* (2013.01); *F03B 13/02* (2013.01); *E21B 47/06* (2013.01); *E21B 47/07* (2020.05)

(58) Field of Classification Search

CPC ...... E21B 23/00; E21B 15/045; E21B 33/068; E21B 44/005; E21B 44/02; E21B 41/00; E21B 23/001; E21B 2200/08; E21B 41/0085; E21B 23/10; E21B 47/07; E21B 47/06; F03B 13/02

See application file for complete search history.

(56) References Cited

U.S. PATENT DOCUMENTS

| | | | |
|---|---|---|---|
| 5,184,676 | A | 2/1993 | Graham et al. |
| 5,392,715 | A | 2/1995 | Pelrine |

(Continued)

FOREIGN PATENT DOCUMENTS

| | | |
|---|---|---|
| WO | 9802634 | 1/1988 |
| WO | 2016076875 | 5/2016 |

*Primary Examiner* — Yong-Suk (Philip) Ro

(74) *Attorney, Agent, or Firm* — Scott Richardson; Parker Justiss, P.C.

(57) ABSTRACT

Provided is a wellbore tractor and method for operating a well system. The wellbore tractor, in one aspect, includes a base member, and one or more turbines fixed to the base member for rotating the base member in a first rotational direction based upon a first direction of fluid flow. The wellbore tractor, according to this aspect, further includes one or more wellbore engaging devices radially extending from the base member, the one or more wellbore engaging devices contactable with a surface of a wellbore for displacing the base member and one or more turbines axially downhole as the one or more turbines rotate in the first rotational direction.

17 Claims, 12 Drawing Sheets

Related U.S. Application Data

Figure 1:
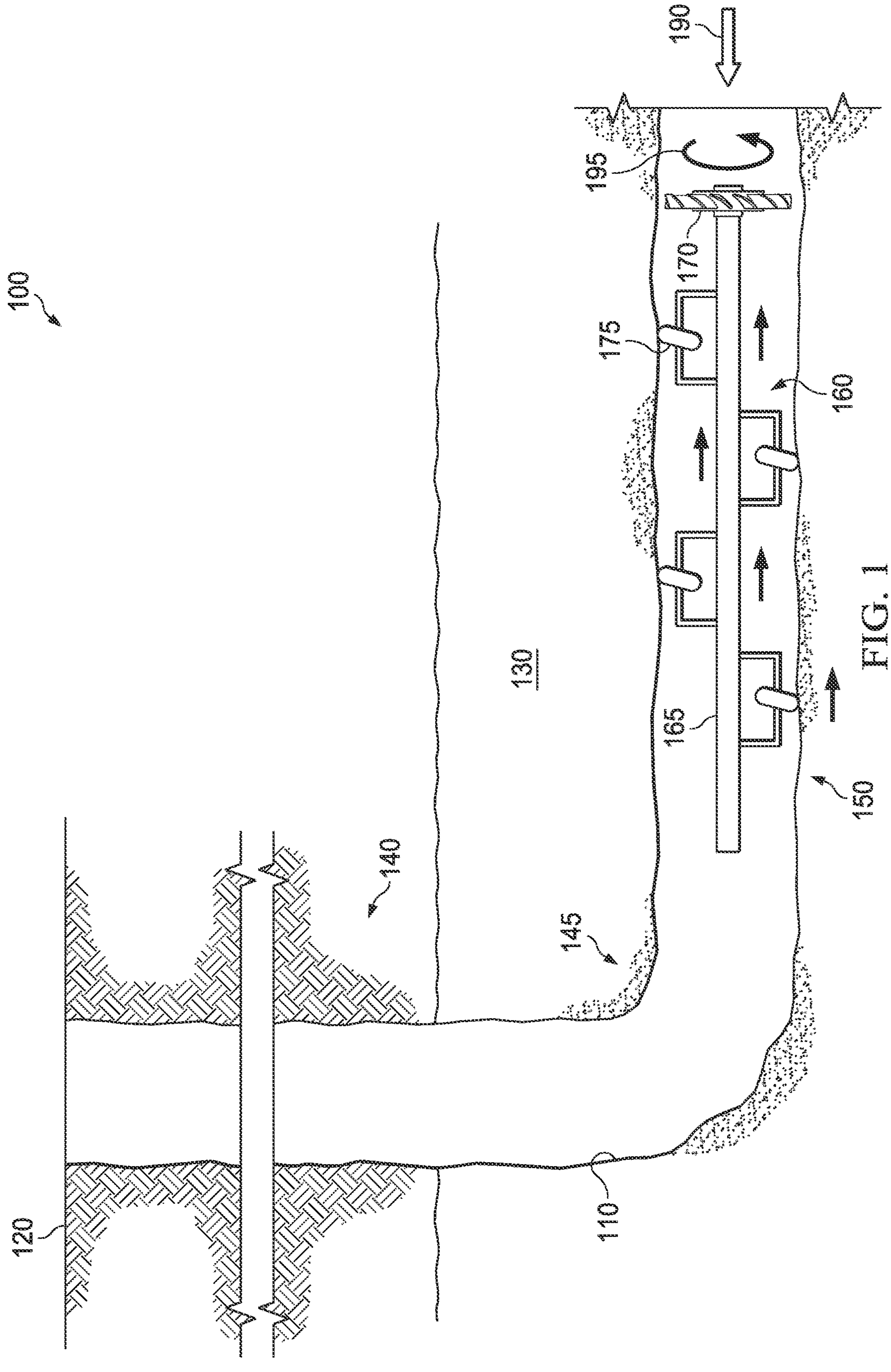

(60) Provisional application No. 62/679,107, filed on Jun. 1, 2018.

(51) Int. Cl.

| | |
|---|---|
| ***E21B 44/02*** | (2006.01) |
| ***F03B 13/02*** | (2006.01) |
| *E21B 47/06* | (2012.01) |
| *E21B 47/07* | (2012.01) |

(56) References Cited

U.S. PATENT DOCUMENTS

| | | | | |
|---|---|---|---|---|
| 6,378,627 | B1 | 4/2002 | Tubel et al. | |
| 6,722,442 | B2 * | 4/2004 | Simpson | F16L 55/26<br>166/173 |
| 6,843,317 | B2 | 1/2005 | Mackenzie | |
| 2004/0055746 | A1 | 3/2004 | Ross et al. | |
| 2005/0016302 | A1 * | 1/2005 | Simpson | E21B 47/00<br>73/865.8 |
| 2005/0241824 | A1 * | 11/2005 | Burris, II | E21B 47/04<br>166/134 |
| 2005/0288819 | A1 | 12/2005 | de Guzman | |
| 2008/0053663 | A1 | 3/2008 | Moore | |
| 2011/0035152 | A1 | 2/2011 | Durocher et al. | |
| 2013/0240197 | A1 | 9/2013 | Hallundbaek et al. | |
| 2015/0252677 | A1 * | 9/2015 | Scholz | E21B 41/0085<br>29/889.71 |
| 2016/0251941 | A1 | 9/2016 | Murphree et al. | |

* cited by examiner

AUTONOMOUS TRACTOR USING COUNTER FLOW-DRIVEN PROPULSION

CROSS-REFERENCE TO RELATED APPLICATION

This application is a divisional of U.S. application Ser. No. 16/424,888, filed on May 29, 2019 entitled "AUTONOMOUS TRACTOR USING COUNTER FLOW-DRIVEN PROPULSION," which claims the benefit of U.S. Provisional Application Ser. No. 62/679,107, filed on Jun. 1, 2018 entitled "AUTONOMOUS TRACTOR USING COUNTER FLOW-DRIVEN PROPULSION," commonly assigned with this application and incorporated herein by reference in their entirety.

BACKGROUND

Intervention into the lateral is difficult and typically requires using coiled tubing, jointed tubing, or an e-line driven tractor. Coiled tubing is expensive, the injection lengths are limited by the size of the coil, and furthermore requires a coiled tubing rig to run. Jointed tubing is slow and also requires a rig to be moved into place.

As a result, many of the traditional wellbore interventions have used a tractor to pull a wireline tool. This traditional approach is limited by the weight of the wireline and the cost of the tractor. Autonomous downhole robotic tractors have been desired, but have been limited by battery weight and system cost. What is needed in the art is an improved autonomous downhole tractor that does not experience the drawbacks of existing systems.

BRIEF DESCRIPTION

Reference is now made to the following descriptions taken in conjunction with the accompanying drawings, in which:

FIGS. 1-7 illustrate various different embodiments of well systems manufactured, designed and operated according to the disclosure; and FIGS. 8-17 illustrate various different embodiments of wellbore tractors manufactured, designed and operated according to the disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the formation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure teaches how to make a new class of wellbore tractor that operates without electricity. The wellbore tractor, in one embodiment, is mechanically powered by the flow of wellbore fluid. Thus, in one embodiment, neither wireline nor batteries are required to propel such a wellbore tractor. Notwithstanding, in certain embodiments batteries and/or wireline may be used in conjunction with the mechanical power to propel the wellbore tractor.

Such a wellbore tractor uses the wellbore fluid flow energy to propel the wellbore tractor forward. For example, in one embodiment the wellbore fluid flow energy spins the wellbore tractor such that it spirals into the flow. The result is a very low cost and very rugged wellbore tractor that enables a new class of applications for logging, communication, sealing, and wellbore evaluation.

The present disclosure further focuses on the aspect where the wellbore tractor acts as an autonomous robot. For instance, in such a use the wellbore tractor is placed in the well, the wellbore fluid is allowed to flow uphole, and as a result the wellbore tractor swims downhole to a specific location and performs a predefined job. The design of the wellbore tractor, in one embodiment allows the tool to travel downhole and uphole in vertical and horizontal sections of the wellbore.

A flow-powered wellbore tractor, according to the disclosure, uses the energy of the wellbore fluid (e.g., production fluid) to move forward. The flowing wellbore fluid, in one embodiment, hits the turbine on the front of the wellbore tractor, which causes the turbine to rotate in a first rotational direction, and thus the wellbore tractor to also rotate. In one embodiment, the wellbore tractor has one or more wellbore engaging devices attached thereto that are in contact with a surface of the wellbore. These wellbore engaging devices allow the wellbore tractor to rotate, as the wellbore engaging devices are (e.g., in one embodiment) tilted at a slight angle relative to an axial surface of the wellbore. This slight angle causes the wellbore tractor to advance a little bit into the wellbore with each rotation. Thus, the wellbore fluid flow causes the wellbore tractor to spiral upstream, somewhat like a drill.

A variety of different wellbore engaging devices may be used and remain within the purview of the disclosure. In one embodiment, the wellbore engaging devices are wheels. However, although the term "wheel" is used herein, the present disclosure contemplates that other rolling members, such as tracks, roller bearings, or otherwise, may also be employed in lieu of or in addition to any illustrated wheels. In accordance with one embodiment, the wheels may comprise dissolvable wheels. Accordingly, downhole conditions, such as temperature, pressure, fluid type, etc. may be used to dissolve the wheels, and thus in certain embodiments allow the wellbore tractor to be pushed uphole by the wellbore fluid.

In one embodiment of the disclosure, the wellbore tractor could be made up of two sections: a drive section and an automation section. In accordance with this embodiment, the drive section would take the wellbore tractor downhole, for example using one or more of the ideas discussed above. The automation section, in contrast, would be used to perform a downhole task. For example, the automation section could be a logging tool, for logging information from the wellbore as the wellbore tractor moves downhole. In another embodiment, the automation section includes memory and a receiver for receiving information from one downhole device, includes memory and a transmitter for transmitting information to a downhole device, or memory and a transceiver for receiving information from one downhole device and transmitting information to another downhole device. In another embodiment, the automation section is a perforator tool, and thus may be used to perforate openings in the wellbore, wellbore casing, production tubing, etc. In yet another alternative embodiment, the automation section is a swellable packer tool that is configured to swell and thus deploy downhole.

In yet another embodiment, the automation section is a sleeve shifting tool having a profile configured to engage with a corresponding profile in a downhole sleeve, and thus may be used as a sleeve shifting tool. A contrast between the different methodologies of performing the work can be seen when comparing a downhole power unit (DPU) to shift a sleeve instead of jarring action controlled at the surface. A wellbore tractor according to the disclosure is more analogous to the DPU, where the wellbore tractor has a flow-powered drive section and an automation section for performing work. One focus of the disclosure is to use wellbore fluid flow to power the high energy demand wellbore tractor, and thus in one embodiment eliminate the slickline, e-line, tubing conveyed, or coiled tubing equipment generally required for a DPU.

Many different variations of the wellbore tractor are feasible, all of which are within the purview of the disclosure. In one variation, a wellbore tractor walks to or past a shifting sleeve, dogs latch into the profile, a chute or vanes are configured to catch the flow, and the well flow/pressure shifts the sleeve. In yet another variation, the wellbore tractor carries a lockout sleeve downhole. The lockout sleeve sets and one or more features of the wellbore tractor dissolves. For example, a lockout sleeve might block an inflow control device (ICD), and then the turbine of the wellbore tractor dissolves leaving an open passageway. In this example, the wellbore tractor is both the means of transportation and the tool. In yet another variation, the wellbore tractor travels downhole, engages a fishneck, blocks the flow by use of a chute or shifting vane, and then retrieves the tool having the fishneck.

In yet another variation, multiple different types of drive sections are used. For example, in addition to the flow based drive section discussed above, a powered drive section could also be used. For example, the flow based drive section could be used with one or both of a hydraulically powered drive section or an electrically powered drive section and remain within the scope of the disclosure. Accordingly to one embodiment, the wellbore fluid flow drives the spinning motion as well as generates hydraulic and/or electric energy. This energy may be used for the drive section, for the automation section, or both.

In one example embodiment, the wellbore tractor (e.g., the base member coupled to the turbine) includes a slip clutch, where if the wellbore tractor body stops moving, the turbine continues to turn and flow is used to generate hydraulic and/or electric power that is used for propulsion. An example would be that the wellbore tractor moves downward rapidly and reaches a difficult spot causing the wellbore tractor to stop. The turbine continues to spin and a secondary propulsion system that is stronger but slower kicks in to get it over the difficult part. Once past the difficult part, the primary propulsion system may resume. In one embodiment, a first turbine could provide power for the drive section, and a second turbine could provide power to the automation section (e.g., a sensor or another device). Thus, a wellbore tractor according to the disclosure could have multiple turbines and pumps/generators that do different things.

In one variation, the drag in the pumps/generators impart the turbine momentum to the entire wellbore tractor. If the torque required to spin the wellbore tractor is higher than the drag, the turbine and the tractor body turn at different speeds and the speed difference generates hydraulic/electric power. This also acts as a governor allowing the turbine to turn faster with higher flow rates and limiting the rotational speed of the body. In contrast, a fixed turbine drag increases proportionally faster with increased flow rates. In yet another variation, the body of the wellbore tractor does not spin, just the turbine. The turbine powers a hydraulic pump or drives an electrical generator that is used to drive hydraulic or electrical motors. In this variation, multiple energy harvesting turbines may be used, and furthermore there may be multiple systems that power the propulsion system. Furthermore to this variation, multiple systems can result in a specially tailored function. For example the electric motors provide a fast but weak mode of propulsion, but if the wellbore tractor reaches a “tough” spot in the well, the hydraulic system, which is slow but strong, propels the tractor past the tough spot.

In yet another variation, a means of controlling the device can be to close in the well. When the well closes in, pressure builds which may trigger an atmospheric chamber to shear pins and provide work. An example would be a wellbore tractor that finds a profile. When the surface valve is closed, pressure builds and the atmospheric chamber is triggered, and then slips are deployed and the downhole sleeve is shifted.

An additional variation includes when the wellbore tractor is used to transport a perforator tool to a specific location. Manipulation of the surface valve sends a signal to the guns causing them to fire. The guns are either left in the well, dissolve, or are retrieved by the wellbore tractor. In yet another variation, low flow results in the wellbore tractor swimming against the flow and high flow cause the wellbore tractor to flow out of the well. In this application, one could control the flow rate (e.g., from the surface of the well) to reverse the direction of the axial movement of the wellbore tractor. For example, with a slow flow rate the friction between the wellbore tractor and the wellbore is sufficient to keep the tractor moving in the correct direction, but once a higher flow rate is encountered, the friction between the wellbore tractor and the wellbore is not sufficient to keep the wellbore tractor moving in the correct direction, and thus the wellbore tractor will now move in the opposite direction with the high flow of the fluid.

In yet another variation, the wellbore tractor carries a battery downhole and leaves it there to power existing equipment, or the wellbore tractor places equipment in the well, such as a frac plug. In yet another variation, a battery is used to provide supplemental propulsion to the wellbore tractor. The wellbore tractor relies upon well flow for primary propulsion, but facing a high power demand action, the supplemental energy from the battery may be used to supplement the power needs. In another variation, the wellbore tractor is covered with a swellable packer or carries a swellable packer, and thus can operate as a bridge plug.

This disclosure further focuses on the employment of a simple device that has limited function. The idea is for a simple device that can travel in the counter flow direction and trigger a mechanism. This leads to the possibility of extending the technology of dart/ball into the horizontal section of the completion. Furthermore a means of retrieving the wellbore tractor may be built into the mechanism for its return to the surface. Using a dropped dart/ball to initiate a downhole action is known in the industry. However, dropping balls is limited by gravity. In horizontal sections, the dart/ball must be pumped down into the horizontal sections. Pumping a dart/ball into the well uses a lot of water and has the potential to damage the formation.

This disclosure also includes a dart/ball that can "swim" upstream though vertical and horizontal sections of the well. The ball uses a mechanical flow-driven wellbore tractor to move upstream into the production flow. The energy of the production flow is used to mechanically power the ball. Basically this is a device that swims against the flow.

This disclosure also focuses on the aspect where the wellbore tractor is used to transport an untethered object to trigger a downhole action. The untethered object can be a dart, a ball, a frac plug, a baffle, a bridge plug, a wiper plug, or any other downhole tool. The wellbore tractor is placed in the well, the wellbore fluid is allowed to flow, and the wellbore tractor spirals downhole (including horizontal sections). In one embodiment, the wellbore tractor transverses downhole and triggers a downhole tool. After the downhole tool is triggered, pumping into the well may provide the force to perform work. Once the downhole tool is triggered, the wellbore tractor may return to the surface, may dissolve downhole, or may simply stay in the wellbore.

A wellbore tractor according to the disclosure functions in much the same way as a dropped dart/ball except that it is not gravity driven. The wellbore tractor swims to a location near a seat/receptacle/trigger. Typically the wellbore tractor swims past/to a trigger and activates the downhole tool. For example a spring loaded flapper is propped open and the wellbore tractor causes it to release and close. With the flapper closed, pressure from uphole/downhole provides force to perform work and manipulate the well. This pressure could further cause the flapper to reopen, and thus the wellbore tractor could continue its travel in the counter flow direction.

In one variation, wellbore fluid flow causes the wellbore tractor to travel downhole. At the furthest distance of its travel a mechanism on the wellbore tractor deploys/closes and instantly the wellbore tractor has a much greater flow restriction. The wellbore fluid flow causes the wellbore tractor to move upward, wherein the wellbore tractor lands in the down most receptacle. The well pressure then builds and shifts a sleeve. As the wellbore tractor is self-releasing, it may then move to the next receptacle where the process is repeated.

In another variation, similar to that discussed in the paragraph above, the wellbore tractor travels downward with low flow and upward with high flow. Accordingly, manipulation at the surface could control the direction of movement of the wellbore tractor. In this embodiment, the wellbore tractor might land in a receptacle, wherein the receptacle triggers a change in the wellbore tractor. The wellbore tractor then seals off in the receptacle, and uphole/downhole pressure is utilized to shift the receptacle. In another variation, the pressure is used to set a packer being delivered downhole with the wellbore tractor. In another variation, a counting mechanism could be built into the wellbore tractor, and thus the counting mechanism could for example cause the device to set in a specific receptacle (e.g., the third receptacle).

The ability to log in horizontal sections is limited to tractor driven tools, coiled tubing logging, pump down tools, or tubing conveyed methods. Those interventions require some sort of rig, are limited in distance for evaluating the horizontal, and are expensive. Self-powered devices have previously been limited to battery-powered electrical motors. This disclosure additionally discloses how to build a self-powered wellbore tractor and focuses on the aspect where the wellbore tractor is used to log a wellbore. In one example, a logging instrument may be mechanically affixed to the tractor (or attached to the device). The wellbore tractor may then be placed in the well, and the wellbore fluid is allowed to flow. The wellbore tractor may then spiral its way downhole and through the horizontal sections, logging the well as it goes. It can then get produced out of the hole, for example using a chute, or in another embodiment, the wellbore fluid alone. In another embodiment, the wellbore tractor traverses to the bottom of the well, and thus logs the formation as it travels back up to the surface.

Such a wellbore tractor may be used to provide a low-cost intervention to a wellbore. In one embodiment, the wellbore tractor is used to provide simple logging in a low-cost wellbore. The production flow causes the wellbore tractor to spiral into the wellbore. The wellbore tractor is carrying sensor electronics for logging the wellbore. The sensor electronics could include a power source (battery or turbine generator) as well as either memory and/or a wireless transmitter. The wellbore tractor is logging as it spirals upstream. After the wellbore tractor has completed its mission, the memory is allowed to return to the surface. In one example, one or all of the wheels or the turbine dissolve and the sensor electronic package is produced back to the surface. In other examples, the entire tractor could dissolve and only the memory is released.

While a simple wellbore tractor would provide the function needed, it could be designed with a number of additional features/variations. For example, all or part of the wellbore tractor could dissolve, allowing the instrument package to return to the surface by wellbore flow. Alternatively, at the bottom of the well, the wellbore tractor could deploy a "chute" that results in wellbore fluid flow returning the wellbore tractor to the surface. In another variation, the wellbore tractor is partially composed of a syntactic foam which reduces the density of the wellbore tractor and more easily allows it to be produced to the surface.

In an alternative variation, vanes on the wellbore tractor are reversed and the wellbore tractor walks out of the well powered by well flow. This reversal could be initiated by: increased flow, temperature, pressure, time, electronics, dissolution of a catch, etc. In another variation, the tilt of the wheels is revered and the wellbore tractor walks out of the well powered by well flow. This reversal could be initiated by: increased flow, temperature, pressure, time, electronics, dissolution of a catch, etc. In an alternative embodiment, the wellbore tractor includes a first section used to travel downhole and a second section used to travel uphole. In this embodiment, one of the sections might be disabled when the other is active.

In an alternative embodiment, a logging device coupled to the wellbore tractor transmits a signal as it logs and thus retrieval is optional. For example, the logging device could create an acoustic signal that is received by a distributed acoustic sensing (DAS) fiber optic cable or an acoustic signal that is received by an acoustic transceiver (e.g., DynaLink wireless telemetry). The logging device could create an electromagnetic (EM) signal that is received by a EM transducer.

The wellbore tractor can be designed to work in open hole, cased hole, or completion tubing. Moreover, the wellbore tractor could be designed so that gravity is allowed to propel the wellbore tractor downhole in vertical sections. For example flow of wellbore fluid is stopped in the well when the wellbore tractor is inserted, the wellbore tractor "falls" to the horizontal section, then the flow of wellbore fluid is increased to propel the wellbore tool further downhole through the horizontal section.

While the array of logging applications performed with a wellbore tractor according to the disclosure is only limited by the logging instrumentation, there are certain applications that are very well suited for this type of wellbore tractor. For example, such a wellbore tractor may be used to survey along the length of the wellbore for temperature, flow composition, flow rate, flow noise, or pressure, or may be used to survey valve position, component health, wellbore health, scale formation, corrosion, leaks, etc. In another application, the wellbore tractor goes downhole and act as seismic sensor for a thumper being driven at the surface, or in an alternative embodiment the wellbore tractor "pings" and the signal is interpreted at the surface.

In another application, the wellbore tractor takes one or more samples at various depths. Theses samples are recovered when the wellbore tractor is retrieved. A simple methodology would be for simple vacuum chambers to be fitted with a rupture disk and a onetime check valve. At the prescribed pressure, the disk ruptures and a sample is taken. The onetime check valve prevents fluid from entering and leaving the chamber after the initial sample is taken. Another methodology would be for the vacuum chamber inlets to be controlled by time. Yet another methodology would be for the vacuum chamber inlet to be controlled by temperature.

Additionally, intervention-less logging could be achieved in a subsea well. A remotely operated vehicle (ROV) could transfer the wellbore tractor to a lubricator. The lubricator would open the path to the well and gravity would place the wellbore tractor in the well. A "snatch" mechanism could be built into the lubricator to pull the wellbore tractor the last few feet into the lubricator.

The ability to communicate with downhole equipment and downhole sensors is difficult. Typically communication is accomplished with an expensive wired cable or with power-intensive wireless communication. Reducing the distance for wireless communication will reduce the power consumption and can open new technologies for wireless data transfer. Reducing the wireless communication distance has been achieved by moving the transmitter and receiver closer to each other by lowering an acoustic transceiver on wireline, but this approach does not work in horizontal sections. Reducing the wireless transmission distance in horizontal sections requires the use of tractor driven, coiled tubing, pump down, or tubing conveyed methods which are all expensive and require a rig.

This disclosure also embodies the idea of achieving wireless communication by using a wellbore tractor that is mechanically powered by the production flow. This is a new class of wellbore tractor that propels itself without electricity. Basically this is a wellbore tractor that swims against the flow in order to relay commands, data, and information.

This disclosure also focuses on the aspect where the wellbore tractor acts as a messenger to send or receive information in a well. In one example, the wellbore tractor is placed in the well, the wellbore fluid is allowed to flow, and thus the wellbore tractor spirals downhole (including horizontal sections). As the wellbore tractor passes other pieces of equipment information is broadcasted and/or received. Once the message is transferred, the wellbore tractor may (or may not) return to the surface.

For example, a wellbore tractor according to the disclosure may be used to provide a low-cost wireless communication in a wellbore. In one embodiment, the wellbore tractor is used to carry data between a downhole location and the surface. The production flow causes the wellbore tractor to spiral into the wellbore. The wellbore tractor, in this embodiment, is carrying transceiver electronics for communicating with downhole tools in the wellbore. The transceiver electronics could include a power source (battery or turbine generator), a wireless transceiver, and support electronics. In one example, the wellbore tractor spirals upstream past the downhole tools, and as it passes the downhole tools it relays data with the tool. In one example, the transceiver electronics receives sensor data from a downhole flow sensor and transmits a new position command to an inflow control valve (ICV). After the wellbore tractor has completed its mission, the memory in the electronics is allowed to return to the surface so that the operator can receive the sensor data. In one example, the wheels and the turbine blades dissolve and the sensor electronic package is produced back to the surface. In other examples, the entire tractor could dissolve and only the memory is released.

In one application, the wellbore tractor carries the data entirely back to the surface. Alternatively, the wellbore tractor could carry the data back to a transmission hub where the hub sends the data back to the surface. The transmission hub could be a DynaLink-style acoustic transmitter. The transmission hub could be a wired connection on an upper completion and the wellbore tractor is relaying data from the unwired lower completion to the wired upper completion. Finally, the transmission hub could be in the main bore and the wellbore tractor is carrying information out of a lateral.

Other applications also exist. In one example, the wellbore tractor carries information downhole and transfers it at the appropriate location. For example the wellbore tractor tells the ICV to change setting, for example based upon instruction predetermined at the surface. In another embodiment, the wellbore tractor includes sensors that sense the well, and the wellbore tractor uses the information gained from traveling downhole, to tell the ICV or eICD to readjust.

In an alternative embodiment, the wellbore tractor travels downhole and records RFID information as it logs. The wellbore tractor signals the RFID and receives information back. The downhole equipment can be completely passive with both the signal and receiving function contained within the wellbore tractor. The information for example can be like "ICD-4 is 25% open". This can also be accomplished with other magnetic, electrical, or electromagnetic transmission such as near field communication or radio signals. The short-hop wireless signal could also be acoustic or vibration based transmission. In another embodiment, the wellbore tractor uses RFID information as it logs, and processes that information so that it can tell other equipment what to do. For example "Since ICD-4 is 25% open then close ICD-5 an additional 5%". In this embodiment, the wellbore tractor functions as a power source (e.g., broadcaster). For example, the wellbore tractor travels downhole transmitting a power source. While the downhole tools are passive, when the wellbore tractor is proximate thereto the downhole tools become active.

The application of wireline conveyed tools are limited by friction of the wirelines and need a tractor to enter a horizontal wellbore. While electrically-driven tractors have been developed for electrical wireline, equivalent tractors have not been developed for slickline or sandline. Theoretically, a battery-powered tractor could be developed but the operational life would be limited and the pulling power of a battery-powered tractor would be limited. Tractors for electrical wireline are expensive, heavy, and can only be placed at the end of the wireline. Thus, there is a need for a mechanically-driven wellbore tractor for wireline applications. There is also a need to be able to place these wellbore tractors not only at the end of the wireline but also at intermediate locations to help carry the weight of the wire.

One aspect of this idea is that some of the production flow energy can be used as propulsion for the wireline. One idea is for a wireline wellbore tractor to use wellbore flow to produce some if not all of its propulsion energy demand. The wellbore tractor can be used on the end of the wire, and furthermore a second wellbore tractor can be used as a clamp-on configuration to help support an intermediate location of the wireline and to help reduce the tension on the wire. Such wellbore tractors are likely to be very inexpensive, and in one embodiment the wellbore tractor is used to carry fiber optic cable into the internal diameter (ID) of the tubing. The fiber optic cable can use DTS and DAS to provide real-time understanding of the production, and deployment on the ID allows for installation after the well is operational and may be simpler and less expensive. For fiber optic deployment, the wellbore tractor could be considered a disposable item. In one application, the wellbore tractor dissolves downhole. In another application, the wellbore tractor serves as an anchor for the fiber optic cable.

One goal is for the wellbore tractor to drag the wire and slickline tools to the desired location in the well and through the horizontal section. After work is done, the slickline rig can retrieve the tool string and tractor. Means to accomplish this task and variations include, without limitation: A) The wellbore tractor runs past a sleeve and the wireline tool shift the sleeve when the device is retrieved. Specially designed spring loaded detent jars may be required to jar in the horizontal; B) A DPU device is attached to the slickline string to perform the desired work; C) The wellbore tractor shifts into reverse and helps retrieve the tool/wire; D) Multiple wellbore tractors pull the wire. For example, wellbore tractor devices could be added to the wire as it is unspooled into the well. The wellbore tractors may reverse, helping to retrieve the wire. For example a wellbore tractor may be deployed every 1000 ft., among other locations. Optionally, a signal at the lubricator could signal the wellbore tractor to attach/detach from the wire.

Referring to FIG. 1, depicted is a well system 100 including an exemplary operating environment that the apparatuses, systems and methods disclosed herein may be employed. For example, the well system 100 could use a wellbore tractor according to any of the embodiments, aspects, applications, variations, designs, etc. disclosed in the preceding and/or following paragraphs. The illustrated well system 100 initially includes a wellbore 110. The illustrated wellbore 110 is a deviated wellbore that is formed to extend from a terranean surface 120 to a subterranean zone 130 (e.g., a hydrocarbon bearing geologic formation) and includes a vertical portion 140, a radius portion 145, and a horizontal portion 150. Although portions 140 and 150 are referred to as "vertical" and "horizontal," respectively, it should be appreciated that such wellbore portions may not be exactly vertical or horizontal, but instead may be substantially vertical or horizontal to account for drilling operations. Further, the wellbore 110 may be a cased well, a working string or an open hole, and is of such length that it is shown broken.

Further, while the well system 100 depicted in FIG. 1 is shown penetrating the earth's surface on dry land, it should be understood that one or more of the apparatuses, systems and methods illustrated herein may alternatively be employed in other operational environments, such as within an offshore wellbore operational environment for example, a wellbore penetrating subterranean formation beneath a body of water.

In the illustrated embodiment of FIG. 1, a wellbore tractor 160 manufactured and designed according to the disclosure is positioned within a wellbore 110. In accordance with one embodiment of the disclosure, the wellbore tractor 160 is mechanically powered by wellbore fluid 190. In this instance, energy from the wellbore fluid 190 spins the wellbore tractor 160, causing the wellbore tractor 160 to spiral into the flow.

The wellbore tractor 160 illustrated in FIG. 1 includes a base member 165. The base member 165 is illustrated as a shaft in the illustrative embodiment, but may comprise many different designs and/or sizes and remain within the scope of the disclosure. A single turbine 170 is fixed to the base member 165 in the embodiment of FIG. 1. The term "fixed" as used herein, means that the base member 165 and the one or more turbines 170 rotate as a single unit. The term "turbine" as used herein, is meant to include a structure having two or more blades or vanes that are positioned to induce rotation. Given the foregoing, the turbine 170 is configured to rotate the base member 165 in a first rotational direction 195 based upon a first direction of fluid flow, which in the illustrated embodiment is the fluid 190. It should be noted that while a single turbine 170 is fixed to the base member 165 in the illustrated embodiment of FIG. 1, other embodiments exist wherein additional turbines are coupled and/or fixed to the base member 165, as will be further discussed below.

The wellbore tractor 160 additionally includes one or more wellbore engaging devices 175 radially extending from the base member 165. In accordance with one embodiment of the disclosure, the one or more wellbore engaging devices 175 are contactable, and in fact in contact with, a surface of the wellbore 110. Accordingly, the one or more wellbore engaging devices 175 displace the base member 165 and turbine 170 axially downhole as the turbine 170 rotates in the first rotational direction 195, for example in response to the flow of the fluid 190 there past. The wellbore tractor 160 illustrated in FIG. 1 is fairly simple in design, and thus does not include one or more of the other aspects, including an automation section, for example as discussed above.

In accordance with the disclosure, the fluid 190, which is production fluid in one embodiment, may be controlled from the surface of the wellbore 110. For example, in one embodiment, the velocity of the flow of production fluid 190 may be controlled from the surface of the wellbore 110 to speed up or slow down the displacement of the wellbore tractor 160 axially downhole. In another embodiment, the velocity of the flow of production fluid 190 may be increased (e.g., from the surface) to a value sufficient to overcome friction between the one or more wellbore engaging devices 175 and the surface of the wellbore 110 and thus push the wellbore tractor 160 uphole. In yet another embodiment, the wellbore tractor 160 may be subjected to fluid (e.g., fluid from the surface) in a second opposite direction to rotate the base member 165 in a second opposite rotational direction to displace the wellbore tractor 160 axially uphole.

Figure 2:
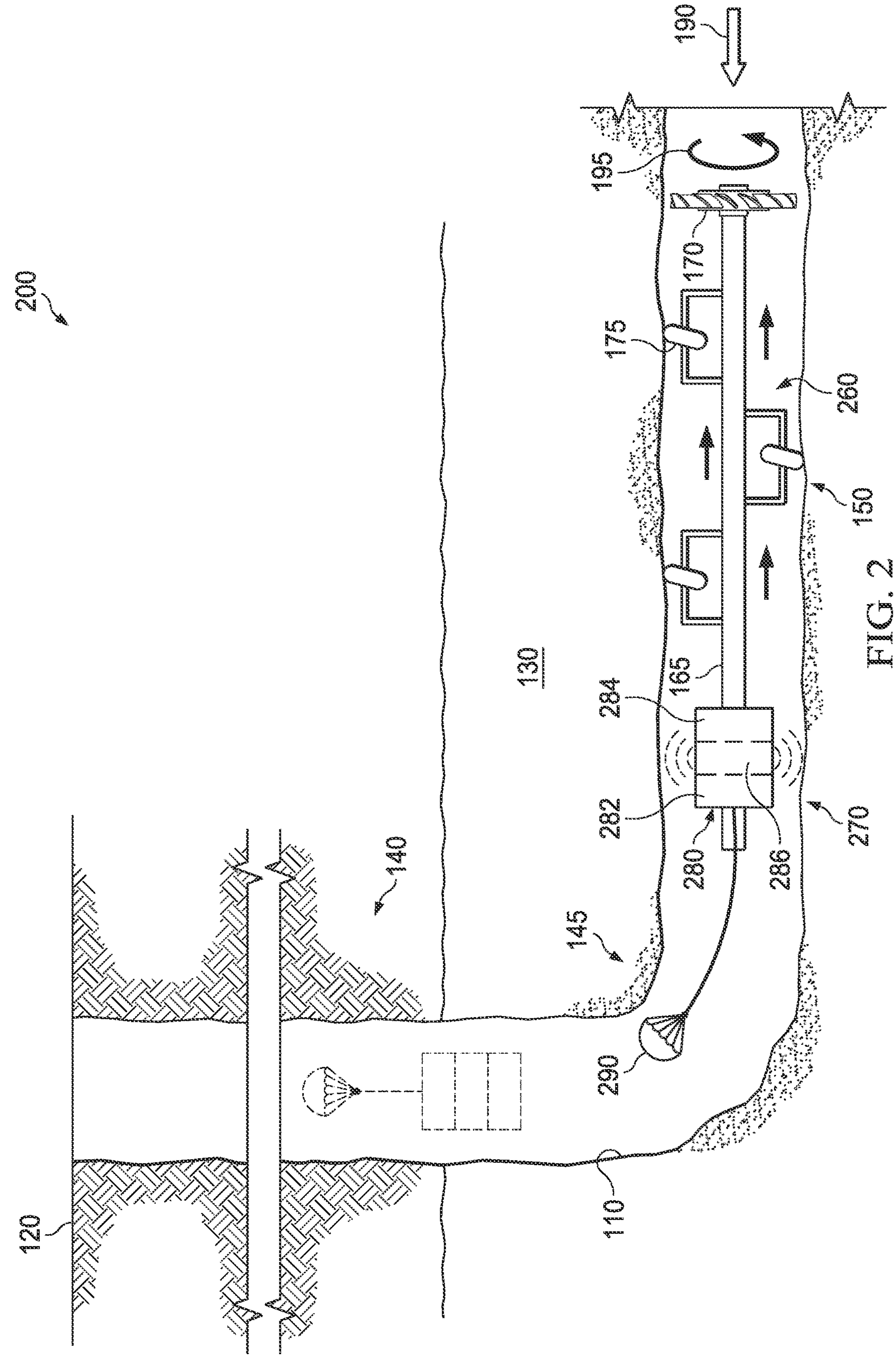

Turning to FIG. 2, illustrated is a well system 200 having an alternative embodiment of a wellbore tractor 260 manufactured and designed according to the disclosure. The well system 200 and wellbore tractor 260 share many elements with the well system 100 and wellbore tractor 160 illustrated in FIG. 1. Accordingly, like reference numerals may be used to indicate similar, if not identical, features. In the embodiment of FIG. 2, the base member 165, turbine 170, and one or more wellbore engaging devices 175 form at least a portion of a flow based drive section, and the wellbore tractor 260 additionally including an automation section 270 for performing a downhole task. In the particular embodiment of FIG. 2, the automation section 270 is a logging tool 280. The logging tool 280, in one embodiment, includes a power source 282, memory 284, and a wireless transmitter 286, among other relevant features, and is configured to log one or more parameters of the wellbore 110. In one embodiment, the logging tool 280 logs the wellbore 110 as it is displaced axially downhole. In another embodiment, the logging tool 280 travels to a downhole end of the wellbore 110, and then logs the wellbore 110 as it travels axially uphole. As discussed above, the logging tool 280, or at least the memory 284 thereof, may return uphole using the flow of the fluid 190, or alternatively using a chute 290.

Figure 3:
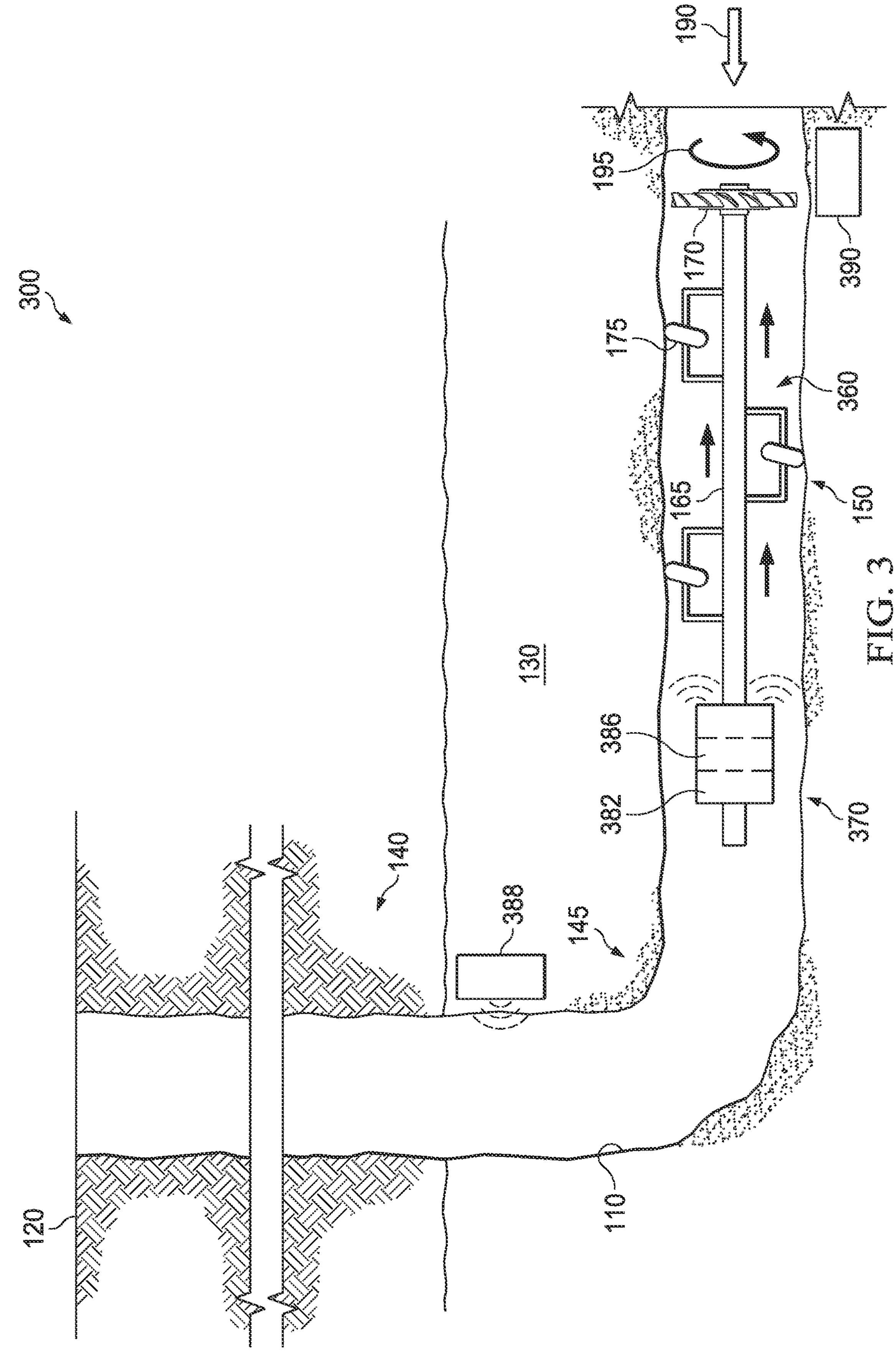

Turning to FIG. 3, illustrated is a well system 300 having an alternative embodiment of a wellbore tractor 360 manufactured and designed according to the disclosure. The well system 300 and wellbore tractor 360 share many elements with the well system 200 and wellbore tractor 260 illustrated in FIG. 2. Accordingly, like reference numerals may be used to indicate similar, if not identical, features. In the particular embodiment of FIG. 3, the wellbore tractor 360 includes an automation section 370 including memory 382 and a transceiver 386. The memory 382 and transceiver 386, in the embodiment of FIG. 3, are configured to receive information from one downhole device 388 (e.g., a flow sensor in one embodiment) and transmit the information to another downhole device 390 (e.g., an ICV in one embodiment), for example wirelessly, as discussed above. While it has been illustrated in FIG. 3 that the downhole device 388 transmits the information and the downhole device 390 receives the information, the opposite may also be true.

Figure 4:
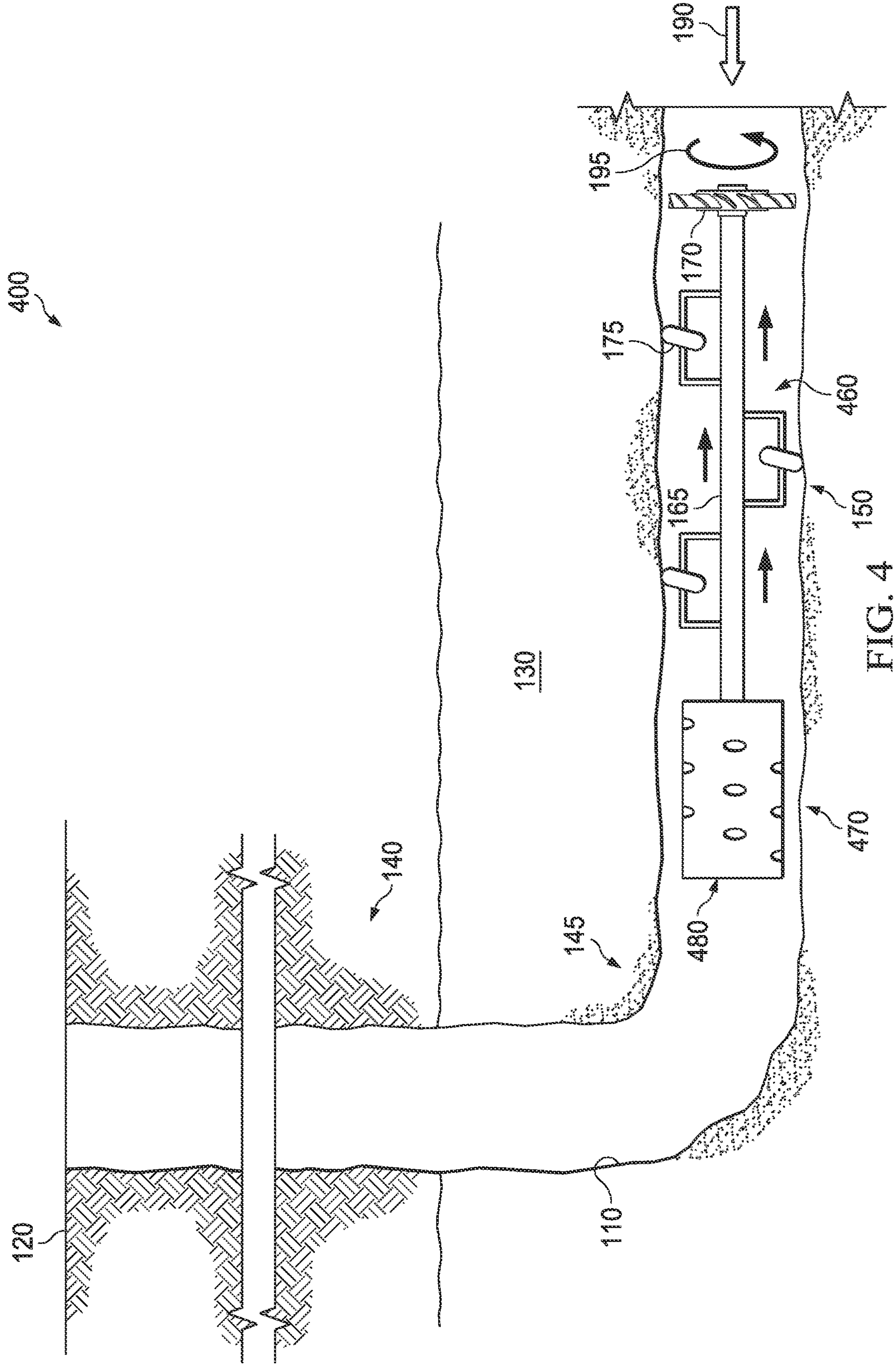

Turning to FIG. 4, illustrated is a well system 400 having an alternative embodiment of a wellbore tractor 460 manufactured and designed according to the disclosure. The well system 400 and wellbore tractor 460 share many elements with the well system 200 and wellbore tractor 260 illustrated in FIG. 2. Accordingly, like reference numerals may be used to indicate similar, if not identical, features. In the particular embodiment of FIG. 4, the wellbore tractor 460 includes an automation section 470. The automation section 470, in the embodiment of FIG. 4, is a perforator tool 480. The perforator tool 480, as those skilled in the art appreciate, may be taken downhole using the wellbore tractor 460 and then used to perforate the wellbore 110, as discussed in greater detail above.

Figure 5:
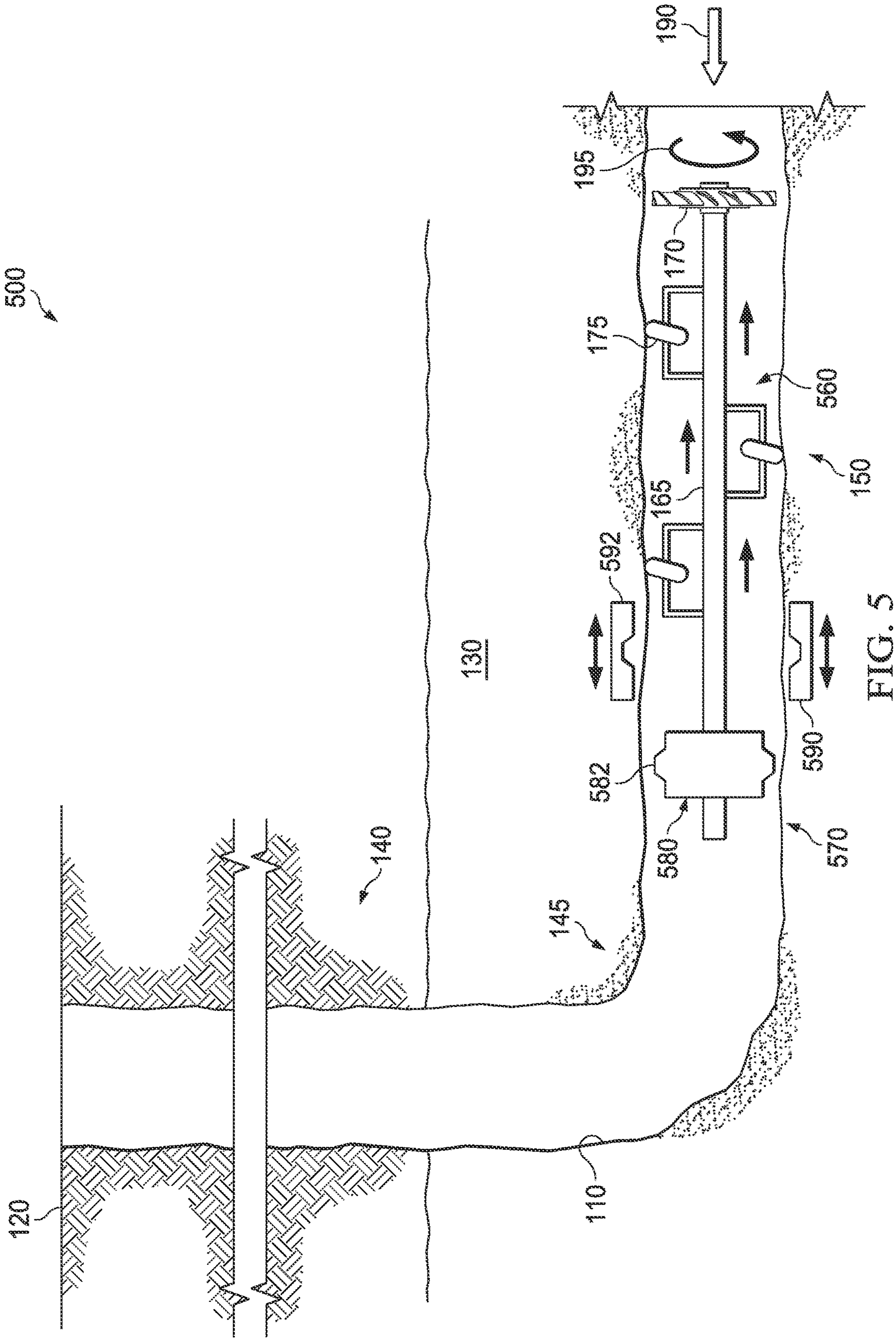

Turning to FIG. 5, illustrated is a well system 500 having an alternative embodiment of a wellbore tractor 560 manufactured and designed according to the disclosure. The well system 500 and wellbore tractor 560 share many elements with the well system 200 and wellbore tractor 260 illustrated in FIG. 2. Accordingly, like reference numerals may be used to indicate similar, if not identical, features. In the particular embodiment of FIG. 5, the wellbore tractor 560 includes an automation section 570. The automation section 570, in the embodiment of FIG. 5, is a sleeve shifting tool 580. The sleeve shifting tool 580, in one embodiment, has a profile 582 configured to engage with a corresponding profile 592 in a downhole sleeve 590. The sleeve shifting tool 580, as those skilled in the art appreciate, may be taken downhole using the wellbore tractor 560 and then used to shift the downhole sleeve 590, as discussed in greater detail above.

Figure 6:
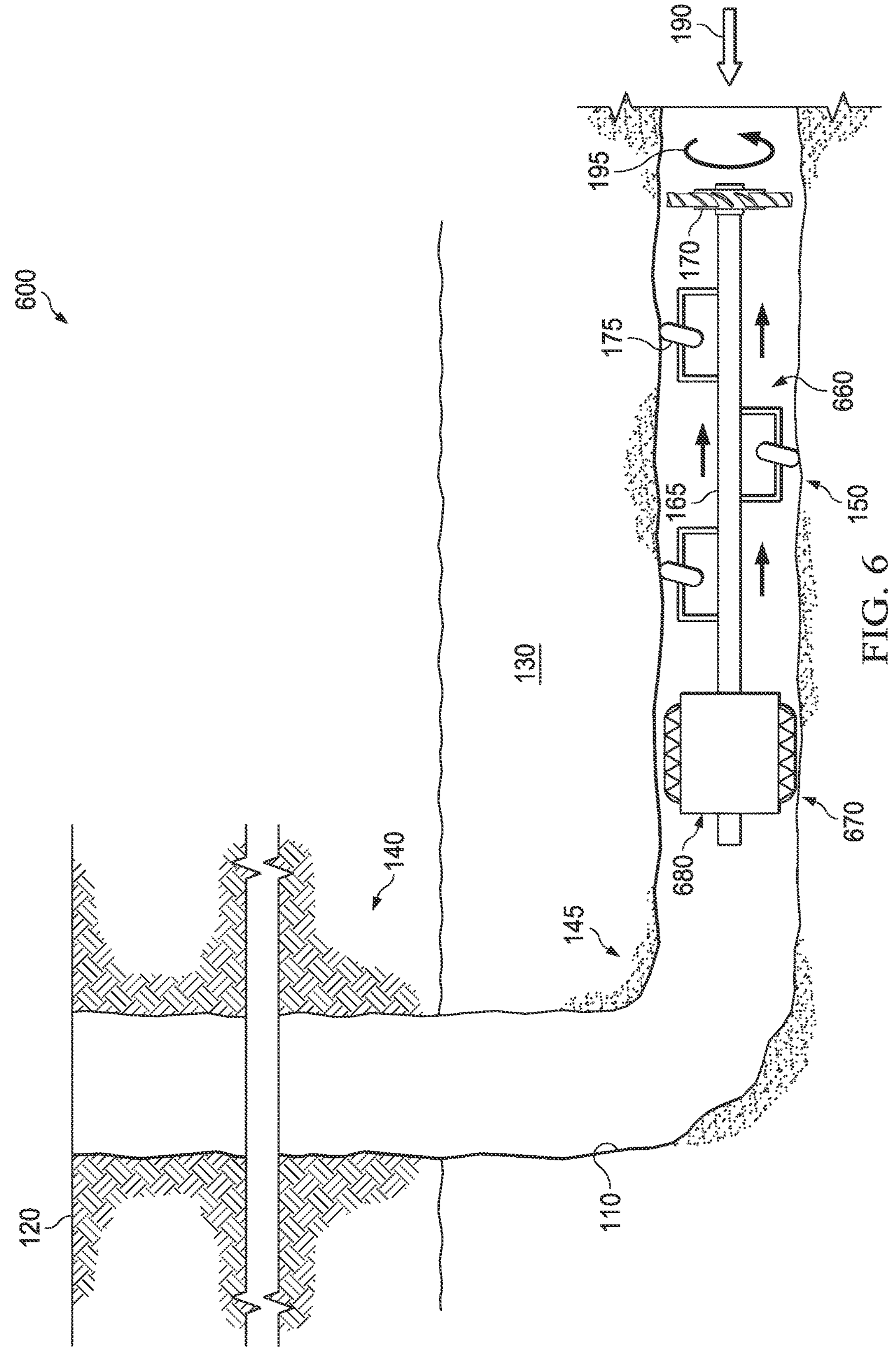

Turning to FIG. 6, illustrated is a well system 600 having an alternative embodiment of a wellbore tractor 660 manufactured and designed according to the disclosure. The well system 600 and wellbore tractor 660 share many elements with the well system 200 and wellbore tractor 260 illustrated in FIG. 2. Accordingly, like reference numerals may be used to indicate similar, if not identical, features. In the particular embodiment of FIG. 6, the wellbore tractor 660 includes an automation section 670. The automation section 670, in the embodiment of FIG. 6, is a swellable packer tool 680. The swellable packer tool 680, as those skilled in the art appreciate, may be taken downhole using the wellbore tractor 660 and then swell to function as a packer or isolation plug, as discussed in greater detail above.

Figure 7:
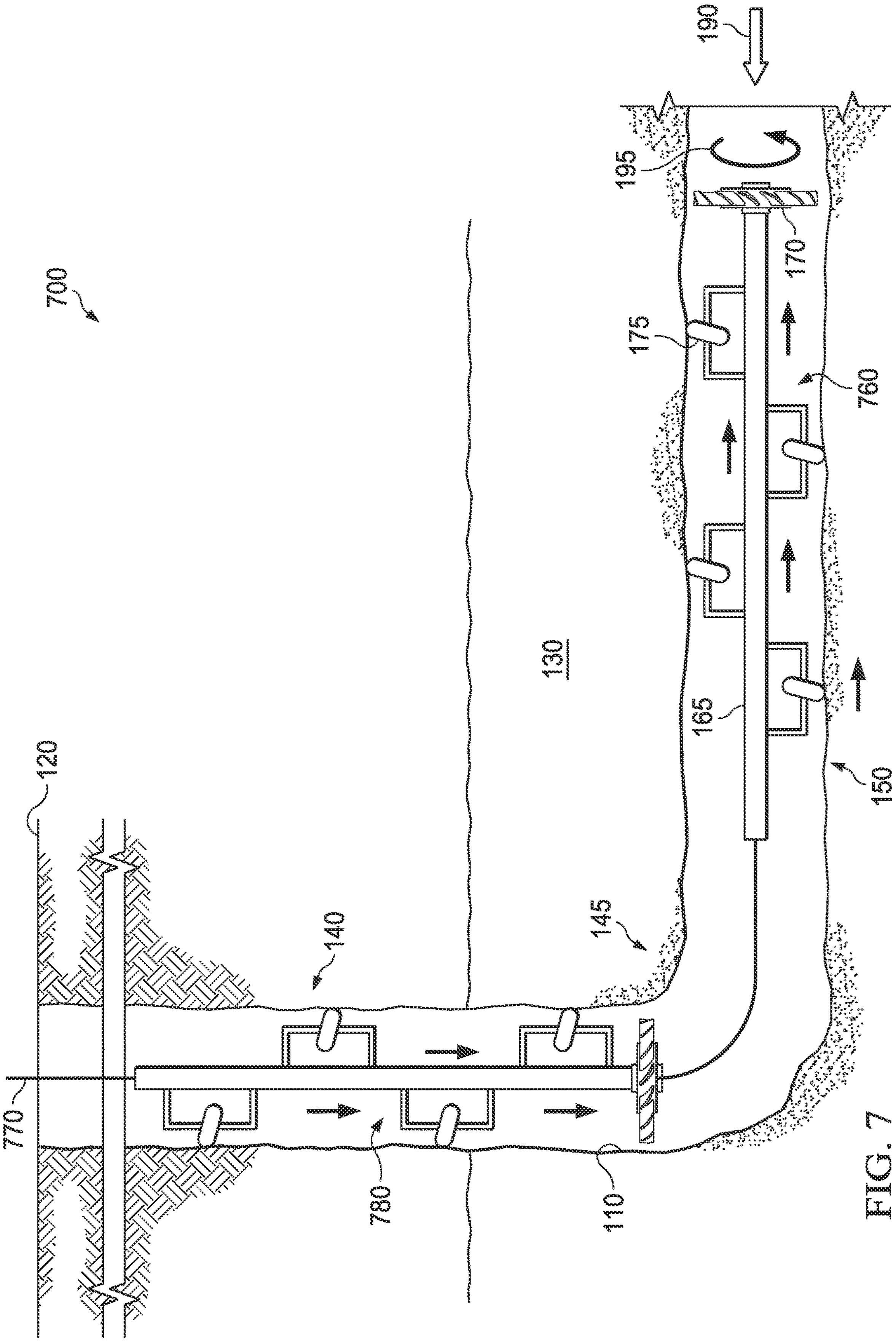

Turning to FIG. 7, illustrated is a well system 700 having an alternative embodiment of a wellbore tractor 760 manufactured and designed according to the disclosure. The well system 700 and wellbore tractor 760 share many elements with the well system 100 and wellbore tractor 160 illustrated in FIG. 1. Accordingly, like reference numerals may be used to indicate similar, if not identical, features. In the particular embodiment of FIG. 7, the wellbore tractor 760 is coupled proximate a downhole end of a wireline 770. The term wireline, as used in this embodiment, is intended to include traditional wireline, slickline, sandline, e-line, braided cable, fiber-optic cable, etc. In the embodiment of FIG. 7, the wireline 770 may be pulled downhole using the wellbore tractor 760. Further to the embodiment of FIG. 7, the wellbore tractor 760 is a first wellbore tractor, and the well system 700 further includes a second wellbore tractor 780. The second wellbore tractor 780, as shown, may be coupled to an intermediate location of the wireline 770 uphole of the first wellbore tractor 760. In accordance with one embodiment of the disclosure, the first and second wellbore tractors 760, 780 may also help return the wireline 770 uphole.

Turning now to FIGS. 8 to 17, illustrated are different embodiments of wellbore tractors manufactured and designed according to the disclosure. The wellbore tractors illustrated in FIGS. 8 to 17 differ from one another primarily in the way their drive section operates. As the wellbore tractors illustrated in FIGS. 8 to 17 share many features, similar reference numerals may be used to indicate similar, if not identical, features. Additional details for each of the wellbore tractors illustrated in FIGS. 8 to 17 may be found in the preceding paragraphs.

Figure 8:
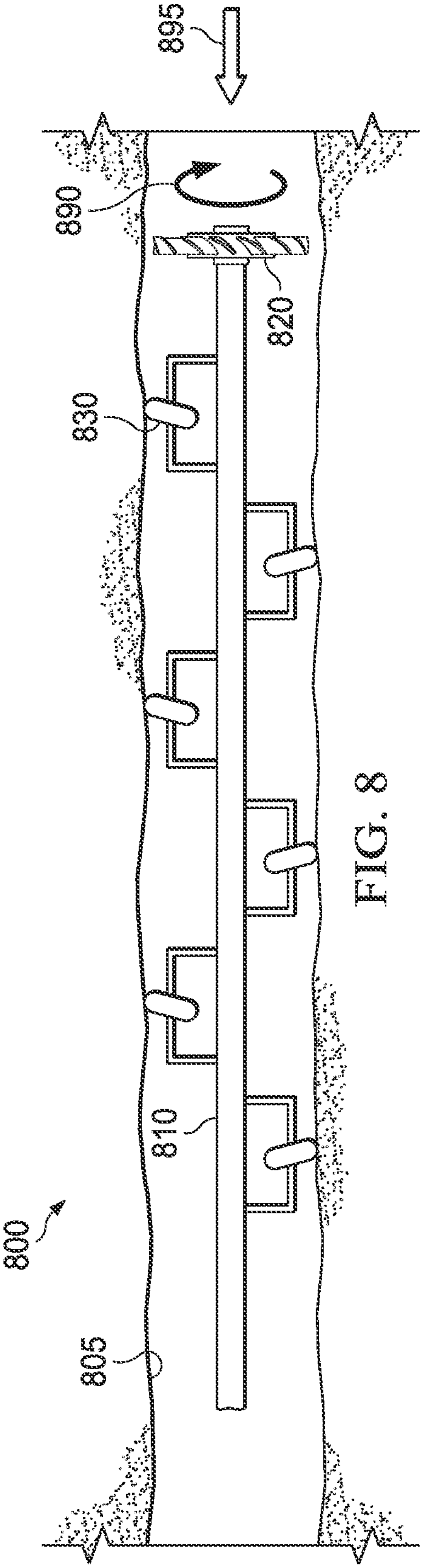

FIG. 8 illustrates one simple embodiment of a wellbore tractor 800 manufactured and designed according to the disclosure, and placed within a wellbore 805. The wellbore tractor 800 includes a base member 810, and a turbine 820 fixed to the base member 810. As is well understood by now, the turbine 820 is designed to rotate the base member 810 in a first rotational direction 890 based upon a first direction of fluid flow, such as may occur with the fluid 895. The wellbore tractor 800 additionally includes a plurality of wellbore engaging devices 830 radially extending from the base member 810. The plurality of wellbore engaging devices 830, in the illustrated embodiment, are contactable with a surface of a wellbore 805 for displacing the base member 810 and turbine 820 axially downhole as the turbine 820 rotates in the first rotational direction 890.

In accordance with the embodiment of FIG. 8, the one or more wellbore engaging devices 830 are one or more wheels. For example, the wheels are positioned at a first tilted direction relative to an axial surface of the wellbore 805. Accordingly, the tilted wheels are configured to displace the base member 810 and turbine 820 axially downhole.

In accordance with one embodiment of the disclosure, the one or more wellbore engaging devices 830, or other features of the wellbore tractor 800, are dissolvable in response to a downhole condition. For example, the one or more wellbore engaging devices 830, or the other features of the wellbore tractor 800 including the turbine 820, may be dissolvable in response to time, temperature, pressure, or fluid type, among other downhole conditions. As discussed in greater detail above, the dissolvable nature of the wellbore tractor 800 allows different parts, or the entirety, of the wellbore tractor 800 to return to the surface of the wellbore 805, in certain instances simply using the flow of the fluid 895.

Figure 9:
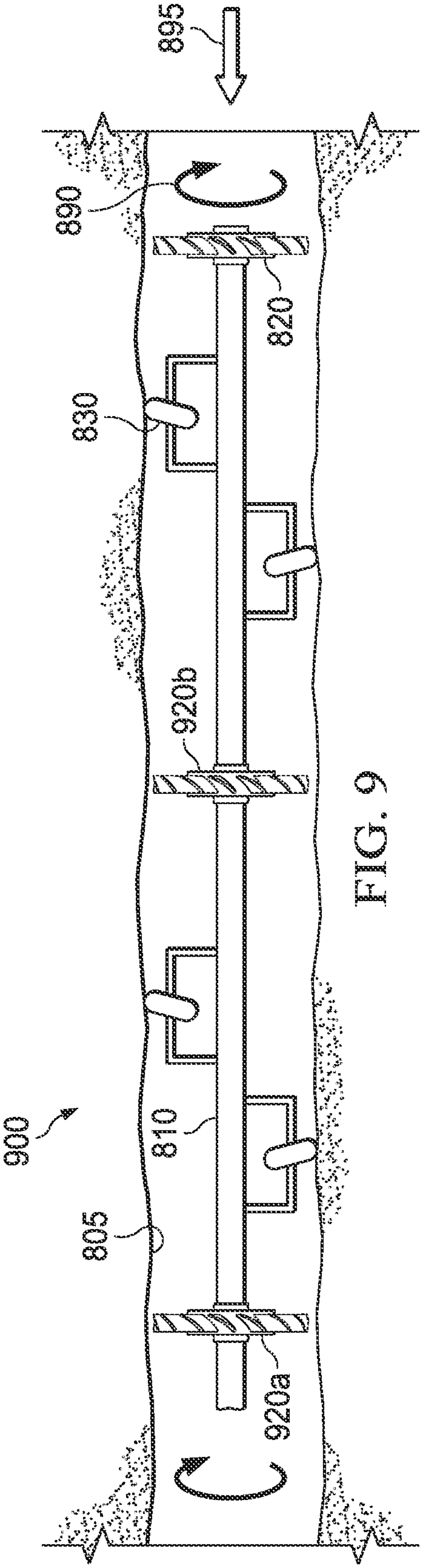

Turning to FIG. 9, illustrated is an alternative embodiment of a wellbore tractor 900 manufactured and designed according to the disclosure. The wellbore tractor 900 primarily differs from the wellbore tractor 800 of FIG. 8 in that the wellbore tractor 900 includes a second turbine 920*a*, and in this particular embodiment a third turbine 920*b*. In the illustrated embodiment, the second turbine 920*a* and turbine 820 are fixed at opposing ends of the base member 810. Additionally, the third turbine 920*b* is positioned between the second turbine 920*a* and the turbine 820, for example substantially at a midpoint between the two. The second and third turbines 920*a*, 920*b*, in the illustrated embodiment, have the same orientation or handedness as the turbine 820, and thus are also configured to rotate the base member 810 in the first rotational direction 890. In the illustrated embodiment of FIG. 9, the turbines 820, 920*a*, 920*b* are configured to rotate the base member clockwise to advance the wellbore tractor 900 downhole (e.g., as looking up at the wellbore tractor 900 from downhole). The second and third turbines 920*a*, 920*b*, as those skilled in the art now understand, provide additional torque for displacing the wellbore tractor 900 axially downhole.

Figure 10:
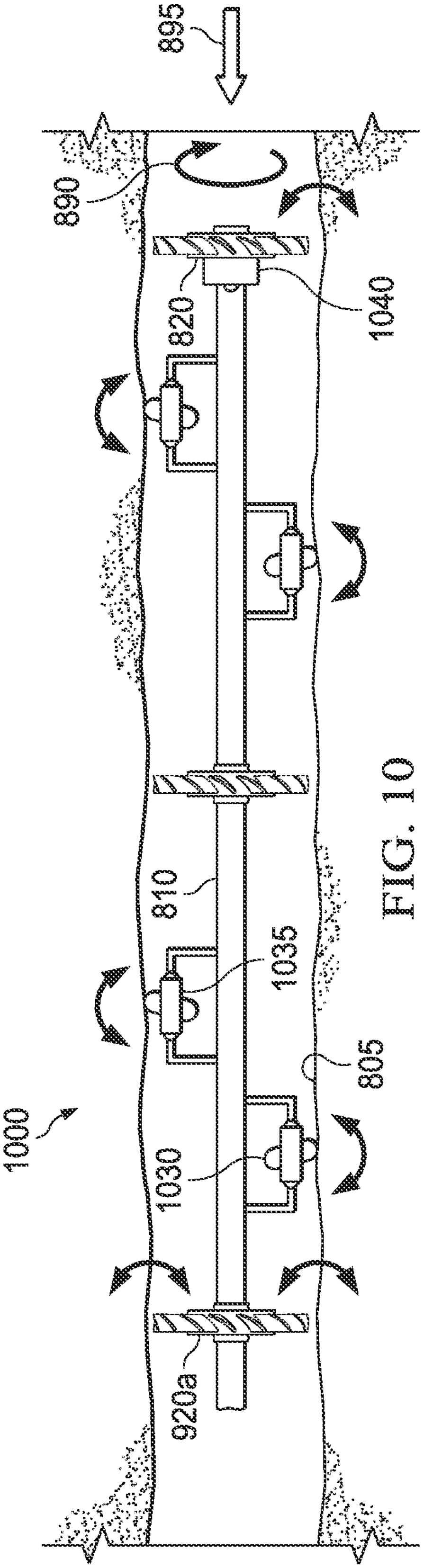

Turning to FIG. 10, illustrated is an alternative embodiment of a wellbore tractor 1000 manufactured and designed according to the disclosure. The wellbore tractor 1000 primarily differs from the wellbore tractor 800 of FIG. 8 in that the one or more wellbore engaging devices 830 are one or more wheels 1030, and the wellbore tractor 1000 further includes one or more wheel actuation members 1035 coupled to the one or more wheels 1030. In the illustrated embodiment of FIG. 10, the one or more wheel actuation members 1035 are configured to adjust an angle of tilt of the one or more wheels 1030 relative to the axial surface of the wellbore 805. Such adjustments to the angle of tilt may be used for speeding up or slowing down the displacement of the wellbore tractor 1000 axially downhole. The one or more wheel actuation members 1035, in certain embodiments, may also be used to move the one or more wheels 1030 from the first tilted direction (e.g., as illustrated in FIG. 10) to a second opposite tilted direction (not shown) relative to the axial surface of the wellbore 805 for displacing the wellbore tractor 1000 axially uphole.

The wellbore tractor 1000 illustrated in FIG. 10, in one embodiment, may further include one or more turbine actuation members 1040 coupled to the one or more turbines. In the illustrated embodiment of FIG. 10, the one or more turbine actuation members 1040 are configured to adjust an angle of tilt of the one or more turbines, and more particularly their blades and/or vanes, relative to the first direction of fluid flow. Accordingly, the one or more turbine actuation members 1040 may be used to speed up or slow down the displacement of the wellbore tractor 1000 axially downhole, as well as potentially reverse totally, wherein the wellbore tractor 1000 can be displaced axially uphole using the same direction of fluid flow.

The one or more wheel actuation members 1035 may be operable in response to a variety of different signals or conditions. In one embodiment, the one or more wheel actuation members 1035 receive a signal from uphole. In another embodiment, the one or more wheel actuation members 1035 are operable in response to a downhole signal generated in the wellbore tractor 1000. For example, the one or more wheel actuation members 1035 could move in response to changes in time, temperature or pressure, among other conditions measured in the wellbore tractor 1000, particularly when changing from a state that moves the wellbore tractor 1000 axially downhole to an opposite state that moves the wellbore tractor 1000 axially uphole. The one or more turbine actuation members 1040 may also be operable in response to a variety of different signals or conditions, including the same signals or conditions as the one or more wheel actuation members 1035

Figure 11:
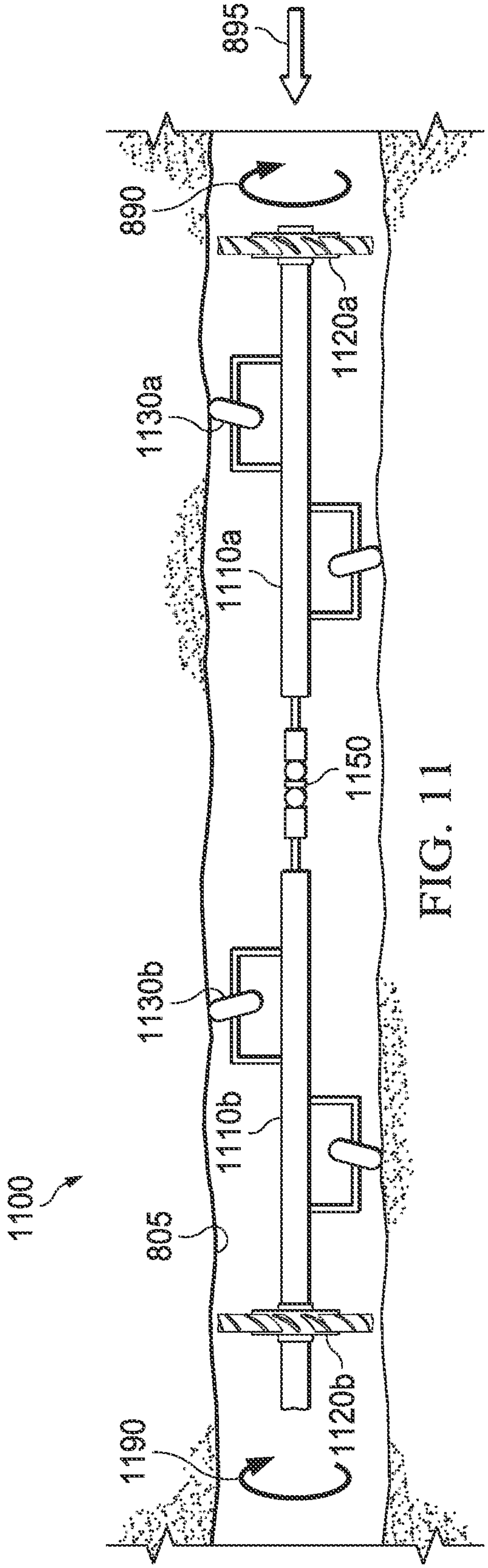

Turning to FIG. 11, illustrated is an alternative embodiment of a wellbore tractor 1100 manufactured and designed according to the disclosure. The wellbore tractor 1100 differs significantly from the wellbore tractor 800 of FIG. 8. In the embodiment illustrated in FIG. 11, the base member 810 is a first base member 1110*a*, the one or more turbines 820 are one or more first turbines 1120*a*, and the one or more wellbore engaging devices 830 are one or more first wellbore engaging devices 1130*a*. The wellbore tractor 1100 illustrated in FIG. 11 further includes a second base member 1110*b*, and one or more second turbines 1120*b* fixed to the second base member 1110*b*. The one or more second turbines 1120*b*, in the illustrated embodiment, are operable for rotating the second base member 1110*b* in a second opposite rotational direction 1190 based upon the first direction of fluid flow 895. Accordingly, the one or more second turbines 1120*b* have an opposite orientation or handedness as the one or more first turbines 1120*a*. For example, while the one or more first turbines 1120*a*, in the illustrated embodiment, are configured to rotate the first base member 1110*a* clockwise to advance the wellbore tractor 1100 downhole (e.g., as looking up at the wellbore tractor 1100 from downhole), the one or more second turbines 1120*b*, in the illustrated embodiment, are configured to rotate the second base member 1110*b* counter clockwise to advance the wellbore tractor 1100 downhole (e.g., as looking up at the wellbore tractor 1100 from downhole).

The wellbore tractor 1100 additionally includes one or more second wellbore engaging devices 1130*b* radially extending from the second base member 1110*b*. In this embodiment, the one or more second wellbore engaging devices 1130*b* are also contactable with the surface of the wellbore 805 for displacing the second base member 1110*b* and one or more second turbines 1120*b* axially downhole as the one or more second turbines 1120*b* rotate in the second opposite rotational direction 1190. In the embodiment of FIG. 11, the first and second base members 1110*a*, 1110*b* are rotatably coupled to one another to allow for the first rotational direction 890 and second opposite rotational direction 1190. For example, a swivel 1150, or another similar device, could be used to rotatably couple the first and second base members 1110*a*, 1110*b* to one another.

Figure 12:
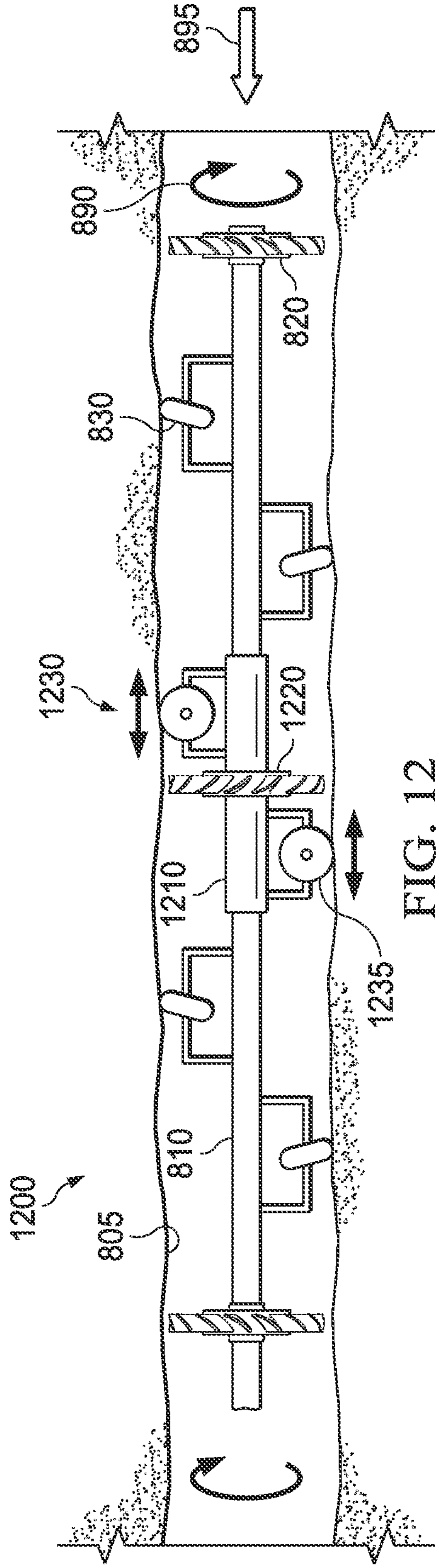

Turning to FIG. 12, illustrated is yet another embodiment of a wellbore tractor 1200 manufactured and designed according to the disclosure. The wellbore tractor 1200, in addition to many of the features of wellbore tractor 800, additionally includes a stator member 1210 rotatably surrounding at least a portion of the base member 810. In the embodiment of FIG. 12, the stator member 1210 has one or more stator turbines 1220 (e.g., a single turbine in this embodiment) fixed thereto for reversing a swirling action of fluid flow exiting the one or more turbines 820. In one embodiment of the disclosure, such as shown in FIG. 12, blades of the one or more stator turbines 1220 have an opposite orientation or handedness to blades of the one or more turbines 820. Such a configuration helps to reverse the swirling action, and thus provide more torque for the wellbore tractor 1200.

The wellbore tractor 1200 additionally includes one or more stator wellbore engaging devices 1230 radially extending from the stator member 1210, the one or more stator wellbore engaging devices 1230 contactable with the surface of the wellbore 805. In accordance with the embodiment shown, the one or more stator wellbore engaging devices 1230 are one or more stator wheels 1235 substantially aligned with a length of the wellbore tractor 1200. Accordingly, the one or more stator wheels 1235 are configured to substantially prevent rotation of the stator member 1210 relative to the surface of the wellbore 805 as the wellbore tractor 1200 is displaced axially downhole. The phrase “substantially prevent rotation,” as that phrase is used herein, means that the stator rotates at a rate less than 10 percent of a rate of rotation of the turbine 820.

Figure 13:
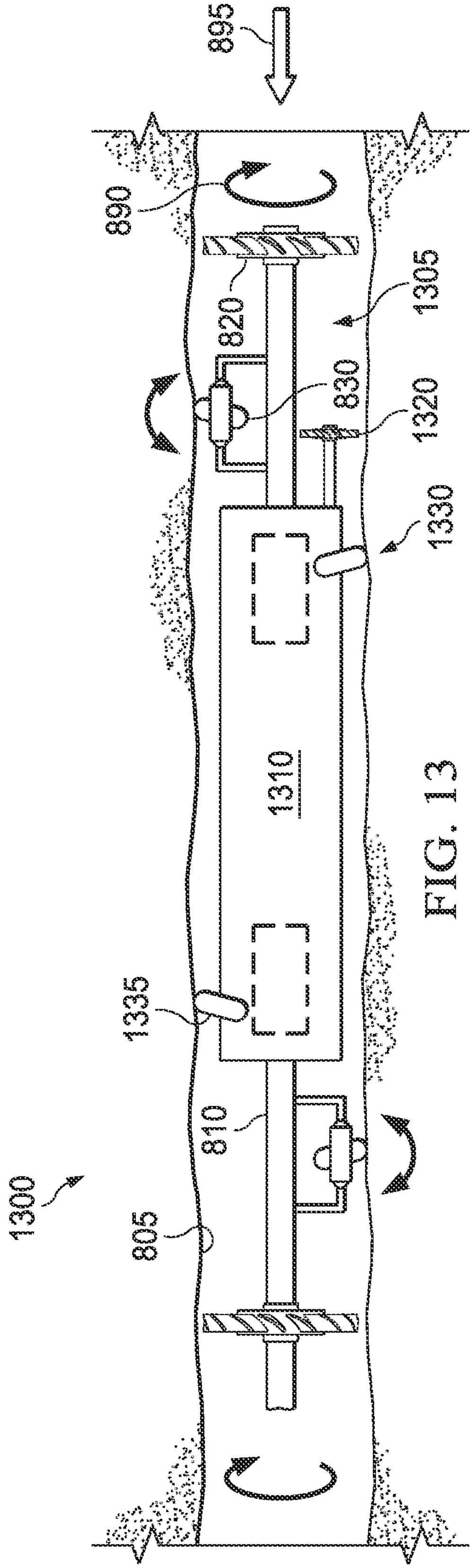

Turning now to FIG. 13, illustrated is another wellbore tractor 1300 manufactured and designed according to another embodiment. The wellbore tractor 1300 is similar in many respects to the wellbore tractor 1000 illustrated in FIG. 10. The wellbore tractor 1300, in the embodiment of FIG. 13, employs the base member 810, one or more turbines 820 and one or more wellbore engaging devices 830 as features of a flow based drive section 1305. The wellbore tractor 1300, in addition to the flow based drive section 1305, includes a powered drive section 1310 coupled to the base member 810. In accordance with the embodiment shown, the powered drive section 1310 includes one or more powered wellbore engaging devices 1330 radially extending therefrom. In this embodiment, the one or more powered wellbore engaging devices 1330 are also contactable with the surface of the wellbore 805 for displacing the wellbore tractor axially downhole.

In certain embodiments, the flow based drive section 1305 is a primary drive section and the powered drive section 1310 is a secondary hydraulically powered drive section. For example, the secondary hydraulically powered drive section may be designed to displace the wellbore tractor 1300 axially downhole if the primary flow based drive section is unable to do so. As discussed in greater detail above, the secondary hydraulic powered drive section may be powered by the fluid flow, for example using the turbine 820 or its own turbine 1320.

In certain other embodiments, the flow based drive section 1305 is the primary drive section and the powered drive section 1310 is a secondary electrically powered drive section configured to displace the wellbore tractor 1300 axially downhole if the primary flow based drive section is unable to do so.

Depending on the design of the wellbore tractor 1300, the one or more powered wellbore engaging devices 1330 are one or more powered wheels 1335 positioned at a first powered tilted direction relative to an axial surface of the wellbore 805. Accordingly, the powered wellbore engaging devices 1330 may also be used to displace the wellbore tractor 1300 axially downhole.

Figure 14:
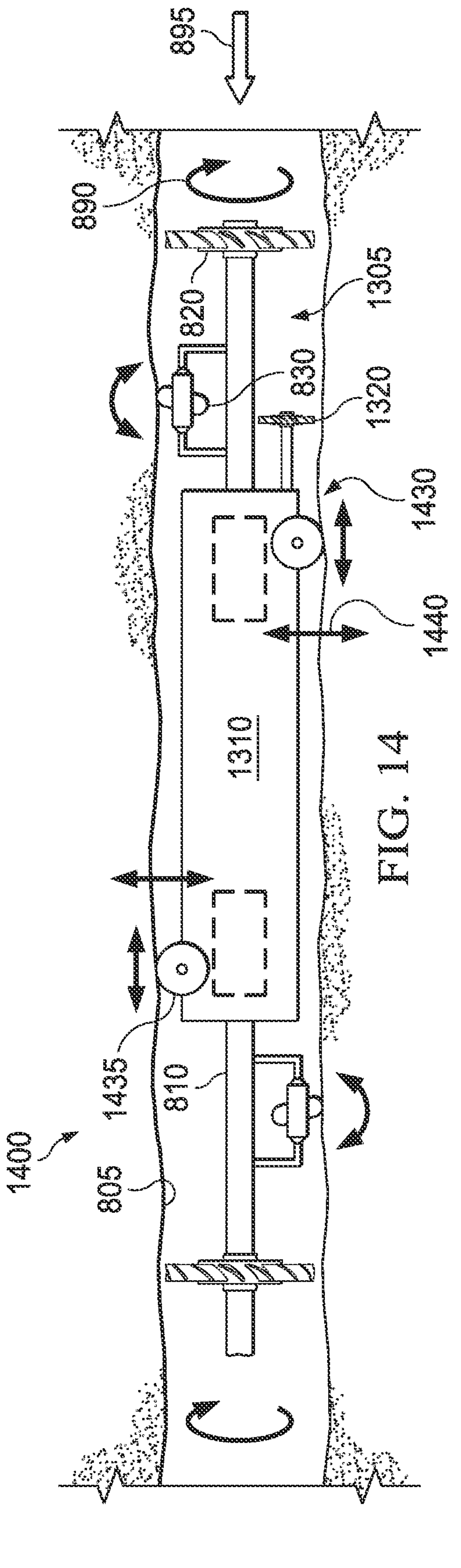

Turning to FIG. 14, illustrated is another embodiment of a wellbore tractor 1400 manufactured and designed according to the disclosure. The wellbore tractor 1400 shares many of the same features as the wellbore tractor 1300. The wellbore tractor 1400 primarily differs from the wellbore tractor 1300 in that its powered wellbore engaging devices 1430, and in the embodiment shown the powered wheels 1435, are substantially aligned with a length of the wellbore tractor 1300 for displacing the wellbore tractor axially downhole. In this embodiment, the one or more powered wellbore engaging devices 1430 could be movable from a first radially retracted state to a second radially extended state in contact with the surface of the wellbore 805, as shown by arrow 1440. The radial movement of the powered wellbore engaging devices 1430 allows them to engage and disengage from the wellbore 805, such that the flow based drive section 1305 may operate.

Figure 15:
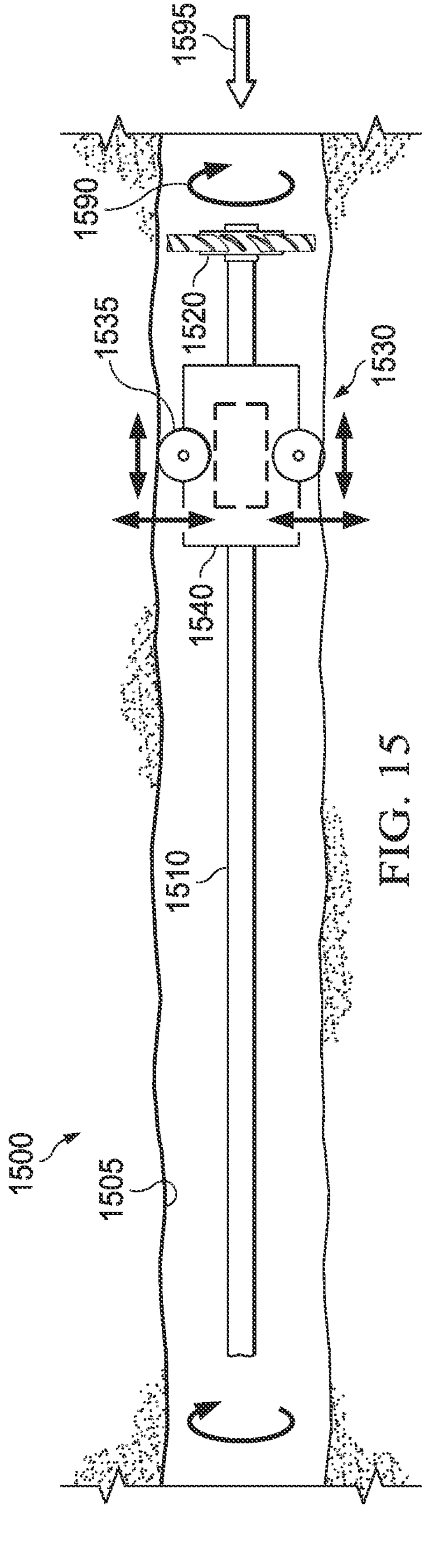

Turning to FIG. 15, illustrated is another, substantially different, embodiment of a wellbore tractor 1500 manufactured and designed according to the disclosure. The wellbore tractor 1500 includes a base member 1510, having a hydraulically powered drive section 1540 coupled thereto. The wellbore tractor 1500 illustrated in FIG. 15 additionally includes one or more turbines 1520 coupled to the hydraulically powered drive section 1540. In accordance with this embodiment, the one or more turbines 1520 power the hydraulically powered drive section 1540 based upon fluid 1595 flow across the one or more turbines 1520, and rotation 1590 thereof. The wellbore tractor 1500 additionally includes one or more wellbore engaging devices 1530 radially extending from the hydraulically powered drive section 1540, the one or more wellbore engaging devices 1530 contactable with a surface of a wellbore 1505 for displacing the wellbore tractor 1500 axially downhole. In the embodiment shown, the one ore more wellbore engaging devices 1530 are one or more powered wheels 1535 that are substantially aligned with a length of the wellbore tractor 1500 for displacing the wellbore tractor 1500 axially downhole. In a simple form of this embodiment, the one or more turbines 1520 power the hydraulically powered drive section 1540 using the fluid 1595, the hydraulically powered drive section 1540 then being used to displace the wellbore tractor 1500 axially downhole.

Figure 16:
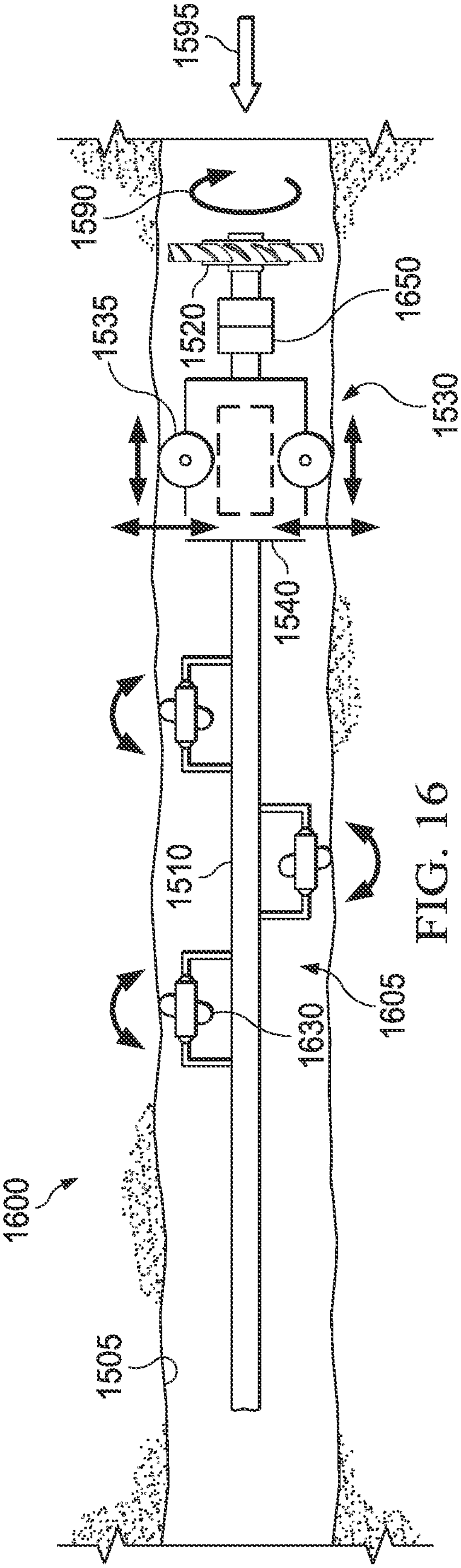

Turning now to FIG. 16, illustrated is yet another embodiment of a wellbore tractor 1600 manufactured and designed according to the disclosure. The wellbore tractor 1600 shares many of the same features as the wellbore tractor 1500 illustrated in FIG. 15, thus similar reference numerals may be used to indicated similar, if not identical, features. The wellbore tractor 1600 mainly differs from the wellbore tractor 1500, in that the hydraulically powered drive section 1540 is a secondary hydraulically powered drive section and the one or more wellbore engaging devices 1530 are one or more hydraulically powered wellbore engaging devices, and further that the wellbore tractor 1600 additionally includes a primary mechanical drive section 1605 coupled to the base member 1510. The primary mechanical drive section 1605, in the illustrated embodiment, includes one or more mechanical wellbore engaging devices 1630 radially extending from the base member 1510. In accordance with this embodiment, the one or more mechanical wellbore engaging devices 1630 are also contactable with the surface of a wellbore 1505 for displacing the wellbore tractor 1600 axially downhole.

The wellbore tractor 1600 illustrated in FIG. 16, in certain embodiments, may include a slip clutch 1650 positioned on the base member 1510 between the one or more turbines 1520 and the hydraulic powered drive section 1540. In accordance with this embodiment, the slip clutch 1650 is configured to fix the one or more turbines 1520 to the base member 1510 and thus displace the wellbore tractor 1600 axially downhole using the one or more mechanical wellbore engaging devices 1630 when in a gripping clutch position. However, the slip clutch 1650 is additionally configured to allow the one or more turbines 1520 to slip with regard to the base member 1510 to power the hydraulically powered drive section 1540 thus displacing the wellbore tractor 1600 axially downhole using the one or more hydraulically powered wellbore engaging devices 1530 when in a slipping clutch position. Additional detail for the slip clutch may be found in above paragraphs.

Figure 17:
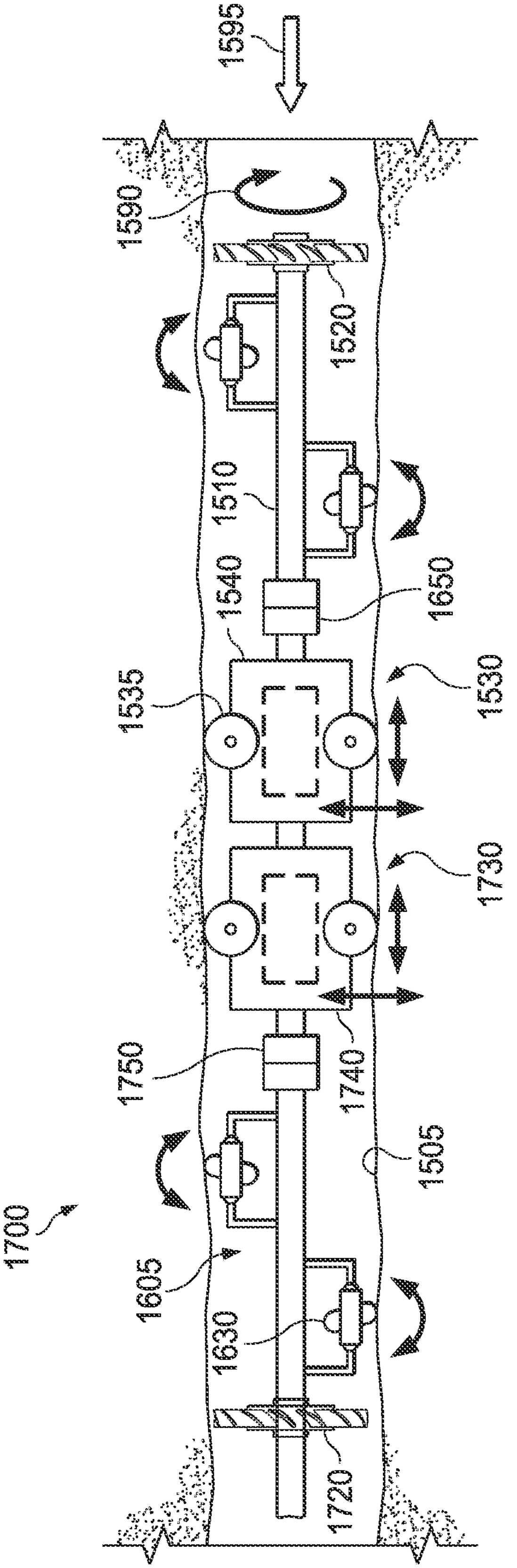

Turning now to FIG. 17, illustrated is another embodiment of a wellbore tractor 1700 manufactured and designed according to the disclosure. The wellbore tractor 1700 shares many of the same features as the wellbore tractor 1600. The wellbore tractor 1700 further includes an electrically powered drive section 1740 coupled to the base member 1510. In this embodiment, one or more electrically powered wellbore engaging devices 1730 radially extending from the electrically powered drive section 1740. As illustrated, the one or more wellbore engaging devices 1730 are contactable with the surface of the wellbore 1505 for displacing the wellbore tractor 1700 axially downhole.

Further to this embodiment, the slip clutch 1650 is a first slip clutch, and the wellbore tractor 1700 further includes a second slip clutch 1750 positioned on the base member 1510. The second slip clutch 1750, in this embodiment, is configured to fix the one or more turbines 1520 to the base member 1510 and thus displace the wellbore tractor 1700 axially downhole using the one or more mechanical wellbore engaging devices 1630 when in a second gripping clutch position, and configured to allow the one or more turbines 1520 to slip with regard to the base member 1510 to power the electrically powered drive section 1740 thus displacing the wellbore tractor 1700 axially downhole using the one or more electrically powered wellbore engaging devices 1730 when in a second slipping clutch position.

The wellbore tractor 1700 illustrated in FIG. 17, in certain embodiments, further includes one or more second turbines 1720. In this embodiment, the second slip clutch 1750 is positioned on the base member 1510 between the one or more second turbines 1720 and the electrically powered drive section 1740. Accordingly, the first slip clutch 1650 may be used in the conjunction with the hydraulically powered drive section 1540, and the second slip clutch 1750 may be used in conjunction with the electrically powered drive section 1740.

Those skilled in the art to which this application relates will appreciate that other and further additions, deletions, substitutions and modifications may be made to the described embodiments.

What is claimed is:

1. A method for operating a well system, comprising:

placing a wellbore tractor within a wellbore, the wellbore tractor including:

a base member;

one or more turbines fixed to the base member for rotating the base member in a first rotational direction based upon a flow of wellbore fluid in a first direction; and one or more wellbore engaging devices radially extending from the base member and configured to rotate along with the base member, the one or more wellbore engaging devices contactable with a surface of a wellbore for displacing the base member and one or more turbines axially downhole as the one or more turbines rotate in the first rotational direction; and subjecting the wellbore tractor to a flow of wellbore fluid in the first direction to displace the wellbore tractor axially downhole.

2. The method as recited in claim 1, wherein subjecting the wellbore tractor to the flow of wellbore fluid includes controlling the flow of wellbore fluid from a surface of the wellbore.

3. The method as recited in claim 1, wherein subjecting the wellbore tractor to the flow of wellbore fluid further includes controlling a velocity of the flow of wellbore fluid from the surface of the wellbore to speed up or slow down the displacement of the base member and one or more turbines axially downhole.

4. The method as recited in claim 1, wherein subjecting the wellbore tractor to the flow of wellbore fluid further includes increasing a velocity of the flow of wellbore fluid to a value sufficient to overcome friction between the one or more wellbore engaging devices and the surface of the wellbore and thus push the wellbore tractor uphole.

5. The method as recited in claim 1, further including subjecting the wellbore tractor to a flow of wellbore fluid in a second opposite direction to rotate the base member in a second opposite rotational direction to displace the wellbore tractor axially uphole.

6. The method as recited in claim 1, wherein the base member, one or more turbines and one or more wellbore engaging devices form at least a portion of a flow based drive section, the wellbore tractor additionally including an automation section for performing a downhole task, and further wherein subjecting the wellbore tractor to the flow of wellbore fluid to displace the wellbore tractor axially downhole includes positioning the automation section axially downhole.

7. The method as recited in claim 6, wherein the automation section is a logging tool, and further wherein positioning the automation section axially downhole includes logging downhole wellbore conditions using the logging tool.

8. The method as recited in claim 7, further including releasing the logging tool from at least a portion of the wellbore tractor, thereby allowing the logging tool to return uphole using the flow of wellbore fluid.

9. The method as recited in claim 6, wherein the automation section includes memory and a transmitter, and further wherein positioning the automation section axially downhole includes transmitting information to a downhole device.

10. The method as recited in claim 6, wherein the automation section includes memory and a transceiver, and further wherein positioning the automation section axially downhole includes receiving information from one downhole device and transmitting the information to another downhole device.

11. The method as recited in claim 6, wherein the automation section is a perforator tool, and further wherein positioning the automation section axially downhole includes perforating the wellbore using the perforator tool.

12. The method as recited in claim 6, wherein the automation section is a sleeve shifting tool having a profile configured to engage with a corresponding profile in a downhole sleeve, and further wherein positioning the automation section axially downhole includes shifting a downhole sleeve.

13. The method as recited in claim 6, wherein the automation section is a swellable packer tool, and further wherein positioning the automation section axially downhole includes deploying the swellable packer tool downhole.

14. The method as recited in claim 1, wherein the wellbore tractor is coupled proximate a downhole end of a wireline, and further wherein positioning the automation section axially downhole includes pulling the downhole end of the wireline axially downhole.

15. The method as recited in claim 14, wherein the wellbore tractor is a first wellbore tractor, and further including a second wellbore tractor coupled to an intermediate location of the wireline uphole of the first wellbore tractor, the second wellbore tractor pulling the intermediate location of the wireline axially downhole.

16. The method as recited in claim 1, further including dissolving at least a portion of the wellbore tractor thereby allowing the at least a portion to return uphole after initially subjecting the wellbore tractor to the flow of wellbore fluid in the first direction.

17. The method as recited in claim 1, wherein the wellbore tractor further includes a chute coupled to at least a portion of the wellbore tractor, and further including deploying the chute thereby allowing the at least a portion to return uphole after initially subjecting the wellbore tractor to the flow of wellbore fluid in the first direction.

* * * * *